United States Patent Office 3,089,729
Patented May 14, 1963

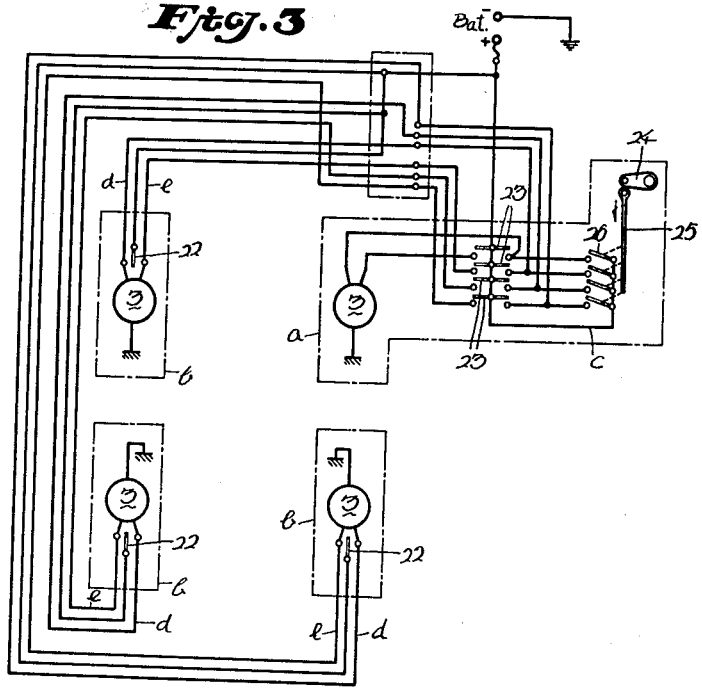
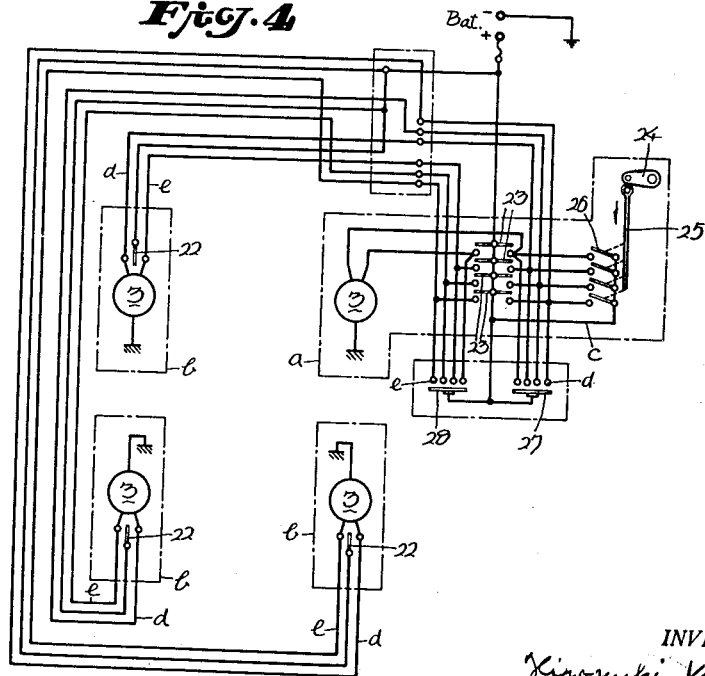

3,089,729
RAISING AND LOWERING DEVICE FOR
AUTOMOBILE WINDOWS
Hiroyuki Kumai, Koto-ku, Tokyo, Japan, assignor to
Kinzo Tajima, Tokyo, Japan
Filed Feb. 28, 1961, Ser. No. 92,262
Claims priority, application Japan July 26, 1960
2 Claims. (Cl. 296—44)

The present invention relates to a raising and lowering device for automobile windows, wherein the window glasses of the respective doors are automatically raised and/or lowered by locking the doors of the driver's seat or of the cab or by manipulating switches disposed within a car, the window glasses stopping their motion when they reach their uppermost or lowermost positions.

It is one object of the present invention to provide a raising and lowering device for automobile windows, wherein the respective windows can not only be raised and lowered independently, but also raised simultaneously by locking the door of the driver's seat, or raised and lowered simultaneously by a switch in a closed circuit, and an input electric source will be automatically disconnected when the window glasses reach their maximum positions, thus saving an excessive load for the motor, so as to decrease the consumption of electric current.

With this and other objects in view, which will become apparent in the following detailed description, the present invention will be clearly understood in connection with the accompanying drawings, in which:

FIG. 3 is a circuit diagram of the electric circuit for the device; and

FIG. 4 is another embodiment of a circuit diagram.

Figure 1:
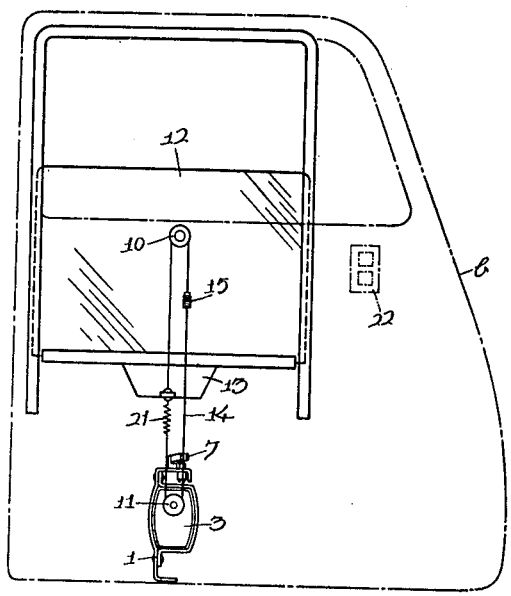
FIGURE 1 is a front elevation of the raising and lowering device for a window glass according to the present invention.
Figure 2:
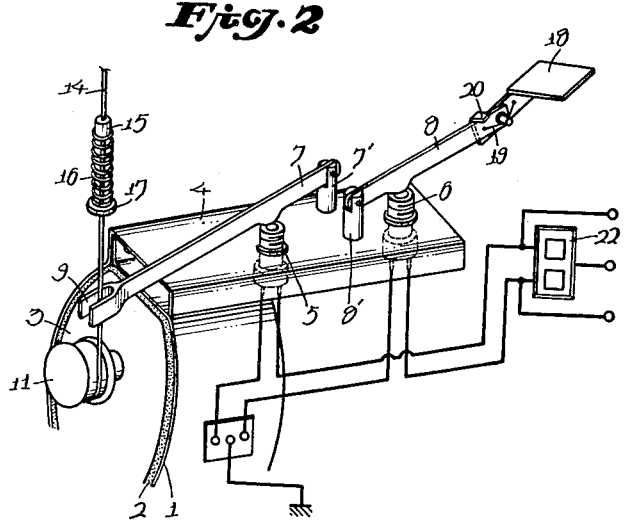
FIG. 2 is an enlarged perspective view of the main parts of the device shown in FIG. 1.

Referring now to the drawings, and in particular to FIGS. 1 and 2, there is disclosed a raising and lowering device for a window glass, wherein a direct current motor is used as a power source. When the device is used in sedan type automobiles, a fitting frame 1 is fixed to a lower part within the respective doors, namely to the side door *a* adjacent the seat, and to the other three doors *b*. A motor 3 having a gear is secured to the frame 1 and is embraced by a vibration-proof rubber member 2. An insulated pedestal 4 is rigidly mounted on the frame 1, and provided with an upper limit switch 5 and a lower limit switch 6 in a normally closed circuit, each of the switches 5 and 6 being pushed from above by the levers 7 and 8, respectively, to open the circuit, the levers 7 and 8 being pivotally supported by the studs 7' and 8', respectively. At the free end of the lever 7, which operates the upper limit switch 5, a fork-shaped part 9 is provided. An endless wire 14 running over a pulley 10, which is rotatably supported by the upper part of the door, and a pulley 11, which is fixed to the shaft of the motor 3, provides the raising and lowering means for the window, by securing the endless wire 14 at a predetermined point to the lower frame 13 of a window glass 12. One side of the wire 14 passes through the fork-shaped or bifurcated part 9 of the lever 7, and a ring 15 is secured to the same side of the wire 14 to abut from above the fork-shaped part 9 of the lever 7 by means of a washer 17 and to move downwardly the fork-shaped part 9. As shown in FIG. 1, the wire 14 is moved clockwise upon rotation of the motor 3 in the same direction, and upon raising the window glass 12 by means of the lower frame 13 to its uppermost position, the ring 15 pushes down the fork-shaped part 9 from above by means of the washer 17, and lowers the free end of the lever 7, whereby the circuit to the motor 3 is opened, due to the operation of the upper limit switch 5. In this case, a suitable buffer is required, to prevent a bending of the lever 7 by means of the ring 15, which will more strongly engage the fork-shaped part 9 due to the inertia of the motor 3.

FIG. 2 shows, therefore, a buffer coil spring 16, the upper end of which is secured to the lower side of the ring 15, so that the spring 16 will loosely surround the wire 14, and its lower end carries the washer 17 which permits the loose passage of the wire 14. Thus upon abutment of the washer 17 on the fork-shaped part 9, the spring 16 will dampen the engagement by compression of the spring 16.

At the free end of the lever 8, a stop member 18 is pivotally disposed thereon, to engage the lower frame 13 in its lowermost position. A spring 19 is disposed around a pivot 19' to raise resiliently the stop member 18 upwardly until a claw 20, secured to the inner end of the stop member 18, stops the raising motion of the member 18. The spring 19 serves also as a damping member to prevent the bending of the lever 8. If the motor 3 rotates in reverse or counter-clockwise direction, the lower frame 13 is lowered together with the window glass 12 until it engages the stop member 18, whereby the lever 8 performs a pivotal movement about the pivot stud 8' to open the circuit of the motor 3 by means of the limit switch 6. The lower frame 13, which will farther descend by its own inertia, will then merely swing the stop member 18 against the force of the spring 19. A spring 21 is also provided on the side of the wire 14 which is connected to the lower frame 13, in order to tension the wire 14 around the pulleys 10 and 11, as well as for assuring more definitely the damping action of the springs 16 and 19. A reversing switch 22 is connected with the side of the electric terminal source, to supply current to the motor 3 provided on the inside face of the door, causing rotation of the motor 3 clockwise and counter-clockwise, respectively, depending upon the position of the reversing switch 22.

When the reversing switch 22 is set and the current supply from the polarity of the electric source is changed to rotate the motor 3 in clockwise and counter-clockwise direction, respectively, the window glass 12 attached to the lower frame 13 on its lower edge will be raised or lowered and their upper and lower limits of movement will be accurately controlled. When the window glass 13 reaches its limit, the circuit is opened, to stop automatically the operation of the motor 3.

Referring now again to the drawings, and in particular to FIGS. 3 and 4, circuit diagrams of the device disclosed in FIGS. 1 and 2 are shown.

The direct current motors 3 disposed within each of the doors *a*, and *b*, are grounded at their negative terminal, and the positive terminal of the electric source, namely the battery disposed on the chassis, is connected to a reversing switch 23, which is disposed on the inner face of the door next to the driver's seat, and which is further connected to a normally open switch 26, which will be closed by means of a pushing rod 25 shiftable by the turning of a claw bar 24 when the door *a* is in its locked position.

Also, each of the other reversing switches 22 are directly connected to the positive terminal of the electric source. From a circuit *c*, which connects the normally open switch 26 with the reversing switch 23, lead wires are branched out, to connect the respective motors 3 with the circuits *d*, which lead wires lead in turn to the positive terminal of the electric source in order to rotate the motor 3 in the direction for raising the window glasses 12, upon closing the corresponding individual circuits.

Another terminal of the reversing switch 23 is connected by lead wires with the respective motors 3 by means of the circuit *e* for the purpose of rotating the motor 3 in reverse direction, as above mentioned. Both of the circuits *d* and *e* are connected with the reversing switches 22.

Since the raising and lowering of the window glass 12 of the door *a* disposed on the side of the driver's seat does not require a remote control of the operation, as it is required for the other doors *b* by means of the reversing switches 22, the switch 22 can be omitted for the operation of the door *a* and the control is effected merely by the reversing switch 23.

Referring now to FIG. 4, the switches 27 and 28 are attached to a panel facing the driver's seat to open and close the connection of the positive terminal of the electric source (connected with the reversing switch 23) with the circuits *d* and *e*, respectively.

As seen from the above description, the motor 3 will be rotated in clockwise direction to raise the window glasses 12 by connecting the reversing switches 22, normally connected with the positive terminal of the electric source, with the terminals of the circuit *d*, and the window glasses 12 are lowered by the counter-clockwise rotation of the motors 3, when the reversing switches 22 are connected with the terminals of the circuit *e*. Further, when the switch 23 is operated to connect the positive terminal of the electric source to the terminals of the circuits *d* or *e*, the window glass 12 of any selected door may be raised and lowered, respectively, independently of the position of the reversing switches 22, and besides, when any door is locked, a claw bar 24 will cause the closing of a switch 26 by means of a pushing rod 25, so that the positive terminal of the electric source will be connected with the motors 3 through the circuits *c* and *d* and the motors 3 will raise the window glasses 12 of all doors simultaneously. When the switch 27 (FIG. 4), which is attached to a panel, is closed, the positive terminal of the electric source feeds all motors 3 through the circuits *c* and *d* and all window glasses 12 are raised in the same manner as in the above mentioned case of door locking. When the switch 27 is opened and the switch 28 is closed, the positive terminal of the electric source is connected with the motors 3 through the circuits *e*, so that the motors 3 will rotate in reverse direction and cause a lowering of all window glasses 12.

The rotation of the motors 3, thus raising and lowering, respectively, the window glasses 12, will cause by movement of the wires 14 the operation of the limit switches 5 and 6, respectively, when the window glasses 12 reach their uppermost or lowermost positions, so that the electric source will be disconnected from the positive terminal of the motor 3, to stop the rotation thereof.

While I have disclosed several embodiments of the present invention, it is to be understood that these embodiments are given by example only and not in a limiting sense, the scope of the present invention being determined by the objects and the claims.

I claim:

1. A device for operating vehicle windows to predetermined open and closed limit positions, respectively, in vehicle doors comprising a mechanism disposed in the vehicle doors and operable from within the vehicle, said mechanism comprising a circuit including a reversible motor for operation of and coordinated to each said vehicle windows, said motors including a first motor, coordinated to a first window disposed in a first vehicle door next to the driver's seat, and a plurality of second motors coordinated to corresponding second windows disposed in corresponding second vehicle doors, each of said windows including a lower frame, two first switches disposed in each vehicle door and operating as limiting means in said circuit and adapted to stop operation of the corresponding of said motors upon reaching the uppermost and lowermost position, respectively, by the corresponding window, a second switch operating as reversing switch in said circuit coordinated to each of said second motors and adapted to reverse the direction of rotation of said second motors, a third switch operating as reversing switch disposed next to the driver's seat and operating said first motor and said second motors in parallel with said second switches, a fourth switch disposed in said circuit in parallel with said second and third switch and operable upon locking said first door, means for raising and lowering, respectively, each of said windows, said means comprising two pulleys disposed vertically spaced apart from each other, an endless wire running on said pulleys being driven by the corresponding of said motors, and said endless wire being secured at a predetermined point to the corresponding of said lower frame in order to join the movement of said endless wire, and lever means disposed in each of said doors and operating said first switches upon reaching the limit positions of the corresponding windows to stop operation of the corresponding of said motors.

2. The device, as set forth in claim 1, which includes a fourth switch disposed in said circuit next to the driver's seat in parallel to said second and third switches and closing selectively said circuit for closing and opening, respectively, simultaneously all said windows.

References Cited in the file of this patent

UNITED STATES PATENTS

| | | |
|---|---|---|
| 2,105,830 | Aiken | Jan. 18, 1938 |
| 2,146,638 | Magid | Feb. 7, 1939 |
| 2,576,816 | Wahlberg | Nov. 27, 1951 |
| 2,585,587 | Rappl | Feb. 12, 1952 |
| 2,696,981 | Ayers | Dec. 14, 1954 |
| 2,907,564 | Wise | Oct. 6, 1959 |

FOREIGN PATENTS

| | | |
|---|---|---|
| 493,522 | Great Britain | Oct. 10, 1938 |